US012785523B2

(12) United States Patent
Serghine et al.

(10) Patent No.: US 12,785,523 B2
(45) Date of Patent: Nov. 3, 2026

(54) ELECTRIC MOTOR ROTOR

(71) Applicant: SAFRAN HELICOPTER ENGINES, Bordes (FR)

(72) Inventors: Camel Serghine, Bordes (FR); Thomas Klonowski, Bordes (FR)

(73) Assignee: SAFRAN HELICOPTER ENGINES, Bordes (FR)

(*) Notice: Subject to any disclaimer, the term of this patent is extended or adjusted under 35 U.S.C. 154(b) by 260 days.

(21) Appl. No.: 18/690,534

(22) PCT Filed: Sep. 14, 2022

(86) PCT No.: PCT/FR2022/051730
§ 371 (c)(1),
(2) Date: Mar. 8, 2024

(87) PCT Pub. No.: WO2023/041873
PCT Pub. Date: Mar. 23, 2023

(65) Prior Publication Data

US 2024/0413722 A1 Dec. 12, 2024

(30) Foreign Application Priority Data

Sep. 14, 2021 (FR) ...................................... 2109613

(51) Int. Cl.
*H02K 15/02* (2025.01)
*B64D 27/30* (2024.01)
(Continued)

(52) U.S. Cl.
CPC ........... *H02K 15/023* (2025.01); *B64D 27/30* (2024.01); *H02K 17/168* (2023.05); *H02K 17/18* (2013.01)

(58) Field of Classification Search
CPC .... H02K 15/021; H02K 15/023; H02K 1/265; H02K 3/32; H02K 15/09; H02K 3/48; H02K 17/168
See application file for complete search history.

(56) References Cited

U.S. PATENT DOCUMENTS 2,292,167 A 8/1942 Smith et al.
5,729,885 A * 3/1998 Carosa .................. H02K 17/18 29/598

(Continued)

FOREIGN PATENT DOCUMENTS

EP 0 583 994 A1 2/1994
EP 2200160 B1 6/2019

(Continued)

OTHER PUBLICATIONS

JP-2001211615-A machine translation Jan. 4, 2026.*

(Continued)

*Primary Examiner* — Leda T Pham
(74) *Attorney, Agent, or Firm* — Sughrue Mion, PLLC

(57) ABSTRACT

A rotor of an aircraft electric motor includes a shaft made of a first material, and a conductive assembly made of a second material different from the first material. The shaft includes a shoulder portion, the shoulder portion includes longitudinal notches. The notches include two contiguous notches radially superimposed in the shoulder portion, a first opening on a radially outer face of the shoulder portion, and a second opening connecting the two contiguous notches. The conductive assembly is a one-piece structure including a conductive bar that is positioned in one notch of the notches, and a skin that is fixed on the shoulder portion.

14 Claims, 9 Drawing Sheets

(51) Int. Cl.

| | |
|---|---|
| ***H02K 15/023*** | (2025.01) |
| ***H02K 17/16*** | (2006.01) |
| ***H02K 17/18*** | (2006.01) |

(56) References Cited

U.S. PATENT DOCUMENTS

| | | | | |
|---|---|---|---|---|
| 6,088,906 | A * | 7/2000 | Hsu .................... | B22D 19/0054 310/211 |
| 10,326,341 | B2 | 6/2019 | Bethge et al. | |
| 10,879,752 | B2 * | 12/2020 | Agapiou .............. | H02K 15/063 |
| 2011/0175484 | A1 | 7/2011 | Wang et al. | |
| 2017/0163135 | A1 | 6/2017 | Emberton et al. | |

FOREIGN PATENT DOCUMENTS

| | | | |
|---|---|---|---|
| FR | 2 779 983 | A1 | 12/1999 |
| GB | 2 333 906 | A | 8/1999 |
| JP | 57-9236 | A | 1/1982 |
| JP | 10-127022 | A | 5/1998 |
| JP | 11-299144 | A | 10/1999 |
| JP | 2001211615 | A * | 8/2001 |

OTHER PUBLICATIONS

French Preliminary Search Report completed Aug. 25, 2022 in French Application No. 2109613.

International Search Report issued Dec. 20, 2022 in International Application No. PCT/FR2022/051730.

Written Opinion issued Dec. 20, 2022 in International Application No. PCT/FR2022/051730.

Yahaya et al., "Advantage of Double Cage Rotor over Single Cage Rotor Induction Motor", Innovative Systems Design and Engineering, vol. 6, No. 12, 2015 (4 pages).

Communication issued Nov. 21, 2025 in European Application No. 22789632.1.

* cited by examiner

ELECTRIC MOTOR ROTOR

CROSS REFERENCE TO RELATED APPLICATIONS

This application is a National Stage of International Application No. PCT/FR2022/051730 filed on Sep. 14, 2022, claiming priority based on French Patent Application No. 2109613 filed on Sep. 14, 2021, the contents of each of which being herein incorporated by reference in their entireties.

FIELD OF THE INVENTION

The present invention relates to the field of electric motors and more particularly relates to the field of the rotors of electric motors for aeronautical applications.

STATE OF THE ART

In a known manner, with the objective of reducing the overall mass of a helicopter engine or more generally of a propulsion chain for a helicopter, the privileged ways are to reduce the mass of the generation and/or starting electric motors or even of electric propulsion motors in the "VTOL" (Vertical Take Off and Landing) or "STOL" (Short Take Off and Landing) field. Indeed, the mass of these systems can reach several tens of kilograms for powers that can go beyond a hundred kilowatts. The current limitations on the electric machines hardly exceed a power/mass ratio of 3.5 kW/kg.

The first limitation of the performances is essentially due to the electromagnetic circuit itself which is governed by the quality of the ferromagnetic materials used or the quality of the magnets (remanent induction Br) when included in these machines.

The current ways of investigation are focused mainly on improving the electromagnetic performances of the electric machines. It is particularly known to try to optimize the material constituting the magnetic circuit, by using the best grades of iron-cobalt or iron-silicon. Another known way of improvement is to minimize losses at the level of the rotor and stator of the machine by refining the sheets making up the stator and/or rotor, thus reducing eddy current losses.

To also improve the torque density of the electric machine, it is known to add permanent magnets to the rotor and/or stator whose remanent magnetic induction can be added to the magnetic field created by the winding which is generally placed in the stator of the electric machine.

The second limitation is the mechanical limitation in the rotational speed of the machines. This speed limitation depends on the nature of the electric machine. There are three main families of electric machines (i.e. electric motors): direct current machines, synchronous machines and asynchronous machines.

Indeed, as shown in the graph of FIG. 1 which represents the maximum power of electric machines as a function of the rotational speed, the maximum powers available at the output of the machine are inversely proportional to the cube of the speed. Once the speed is set by the limitations brought by the environment where the machine will be integrated, the choice of the nature of the machine then becomes essential to obtain an optimum power-to-weight ratio.

Today, the target need in terms of electrical power for integration into a helicopter is in a fairly wide range from around 50 kilowatts to several hundred kilowatts per machine. Thus, with reference to the graph of FIG. 1, the machines identified (d) and (e) are particularly interesting due to the fact that these machines are integrated on boxes of mechanical accessories which have very high rates of several thousand revolutions per minute.

In FIG. 1, the machines (d) are synchronous machines with permanent magnets mounted on the rotor and the machines (e) are asynchronous induction machines with a solid rotor.

Finally, a third limitation is identified. It is intrinsic to the embedded environment and more specifically to the aeronautical field. This third limitation concerns the integrity of the equipment as well as its environment in the event of an internal defect in the electric machine.

Thus, it is necessary, for rotational speeds ranging from 10,000 rpm to more than 100,000 rpm, for the machine to contain high energy debris coming from rotating portions of the rotor of the machine (i.e. the machine must continue to operate despite the breakage and the presence of rotor parts within it). Additionally, in many other failure cases it is necessary for the electric machine to continue to operate.

In an aeronautical application that is to say within the framework of an on-board system requiring strong constraints in terms of compactness, mass and reliability, different electric machine technologies are used. The best known ones can be cited:

- Direct current machine: direct current machines are the most used machines in the aeronautical sector. Their main advantage is to operate on direct current networks without the mandatory use of power electronics. Their main disadvantage is that they include brushes that energize the rotor, which causes premature wear of the brushes and imposes limitations in terms of rotational speed (maximum speed <20,000 rpm).
- Synchronous machine with wound rotor: synchronous machines with wound rotor are machines which have the main advantage of being very easily torque and speed controllable. Indeed, it is possible to manage the flow of the machine very easily by injecting a direct current into the inductor of the machine (rotor portion) using conductive rings linking the stator and the rotor. These machines have a disadvantage similar to the one of the direct current machines, which consists in a maximum speed of the rotor relative to the stator of about 25,000 rpm. This speed limitation is due to the presence of the conductive rings rubbing on the rotor.
- Synchronous machine called 3-stage synchronous machine: these machines are very widely used in the aeronautical sector as a current generator because they have the advantages of being easily controllable and self-excitable without brushes or rings thanks to the rotating of magnets in front of the rotor winding of the machine, the alternating current thus created is then rectified by rotating diodes going to the inductor winding of the machine. The disadvantages of these machines are their relatively large masses due to the fact that they include several conversion stages and also a limitation of the rotational speed (<25,000 rpm) which eliminates the reliability of the rotating diodes when the speed becomes too high.
- Synchronous machine with permanent magnets: machines with permanent magnets are one of the most efficient machine categories in terms of torque density, it is moreover due to their excellent performances that these machines are emerging in the aeronautical electrical systems. Their advantage, which is also their main defect, is that these machines include magnets in the rotor, which has the main advantage that these machines do not include brushes and are self-excited due to the rotation of the magnets. Thus, during an internal defect such as a short circuit on the stator windings, the short circuit is self-sustaining due to the rotation of the magnets that generates this short circuit. It is therefore necessary to be able to stop the rotation of the rotor so that the defect does not propagate. Another disadvantage of this machine is that, when very high rotational speeds (beyond 30,000 rpm) must be reached, the machine must include magnets on the surface of a thickness becoming non-negligible compared to the magnetic air gap which generates an increase in the significant magnetic losses.

Variable reluctance synchronous machine: the reluctance synchronous machine is a machine with strong electromagnetic performances, another advantage is that the rotor is magnetically passive in nature, so in the event of a problem on the stator windings, the machine is de-excited by depowering the stator. The main disadvantage of this machine for use in an aeronautical sector is that this machine requires a very small air gap (<0.5 mm), hence increased complexity for the integration of this machine in a fairly severe vibration environment.

Asynchronous squirrel cage machine: the asynchronous squirrel cage machine is a machine with lower electromagnetic performances compared to the synchronous machines due to the fact that the induction of the rotor currents generated by the stator currents tend to heat the rotor. The notion of slipping is also to be considered in this machine. The slipping is the difference between the pulsation of the currents created in the rotor and the pulsation of the stator currents. This slipping is a fundamental notion because the greater the slipping (tending towards 1) the more torque the machine provides. The fundamental problem with this principle is that the joule effect created in the rotor portion of the machine is directly proportional to the slipping. These machines have significant thermal limitations on the one hand, due to the fact that the bars in which the induced rotor currents circulate are electrical conductors of moderate electrical conductivity due to the fact that these bars must also resist the mechanical forces (centrifugal forces) therefore also have fairly high mechanical properties; and on the other hand, due to the fact that the magnetic material (rotor magnetic circuit) also making up the rotor is a material having interesting magnetic characteristics but also a compatibility with the material of the conductive bars. The electromagnetic performance being a function of the mechanical resistance and the thermal performance of the rotor assembly is generally degraded.

To solve this problem of electromagnetic performance limitation, new topologies of asynchronous machines have recently appeared over the last ten years called solid rotor asynchronous machines. The notion of a solid rotor comes from the fact that the rotor, which can be made of multi-materials, is very compact and resistant to much greater mechanical forces than the asynchronous squirrel cage machines.

In this context, the present invention aims to propose a new asynchronous machine rotor topology having better performances at high speed (i.e. speeds greater than 30,000 rpm).

DISCLOSURE OF THE INVENTION

According to a first aspect, the invention relates to a rotor of an aircraft electric motor, comprising a shaft made of a first material and a conductive assembly made of a second material different from the first material, in which the shaft has a shoulder portion with at least one longitudinal notch and, the conductive assembly is a one-piece structure comprising at least one conductive bar intended to be positioned in the at least one notch and comprising a skin intended to be fixed on the shoulder portion.

At the level of the shoulder portion, the rotor can have a layer of interpenetration of the first material and of the second material, the interpenetration layer comprising an alloy of the first material and of the second material.

The conductive assembly can comprise two rings, a first ring being fixed to the rotor at a first end region of the shoulder portion and a second ring being fixed to the rotor at a second end region of the shoulder portion.

The rotor can comprise a plurality of notches tangentially distributed and/or radially superimposed in the shoulder.

The plurality of notches can comprise two contiguous notches radially superimposed in the shoulder, an opening connecting said two contiguous notches.

The first material can contain at least iron and carbon.

The second material can contain at least one of the metals chosen among copper, aluminum or silver.

According to a second aspect, the invention relates to a method for manufacturing a rotor according to the first aspect, comprising at least one of the steps of:

- inserting the shaft and an element intended to form the conductive assembly in a tubular protective casing;
- heating and pressurizing the assembly containing the casing, the element intended to form the conductive assembly and the shaft, up to a temperature of formation of the conductive assembly and diffusion welding of the conductive assembly and of the shaft to obtain an assembly comprising the casing and the rotor;
- heat treatment for cooling the assembly;
- tempering the assembly;
- separating the casing and the rotor.

The step of inserting the shaft and an element intended to form the conductive assembly in a tubular protective casing comprises a phase of positioning, around the shaft, a powder intended to form the conductive assembly.

The step of heating and pressurizing the assembly can be carried out in a dedicated enclosure and in a neutral atmosphere.

The heat treatment step can comprise a quenching chosen among natural or forced convection gas quenching, water quenching or oil quenching.

The first material can contain at least iron and carbon, and the heat treatment step can be carried out until the first material becomes martensitic.

The method can comprise a preliminary step of machining the shaft.

The step of machining the shaft can comprise at least one phase of machining at least one notch.

DESCRIPTION OF THE FIGURES

Other characteristics, aims and advantages of the invention will emerge from the following description, which is purely illustrative and not limiting, and which should be read in relation to the appended drawings in which.

DETAILED DESCRIPTION OF THE INVENTION

Rotor

Figure 1:
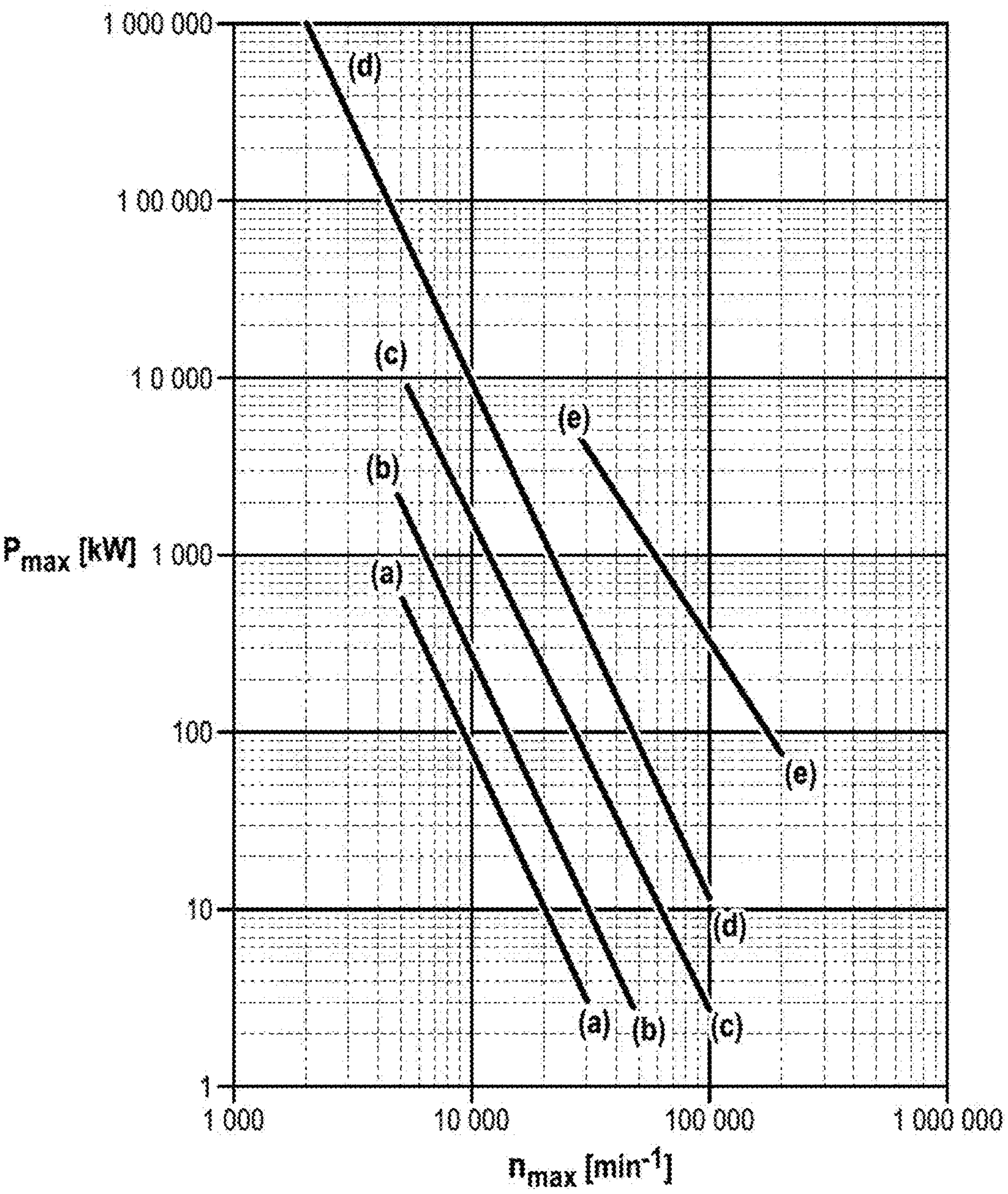
FIG. 1 is a graph representing the maximum power of different electric machines as a function of the rotational speed.
Figure 2:
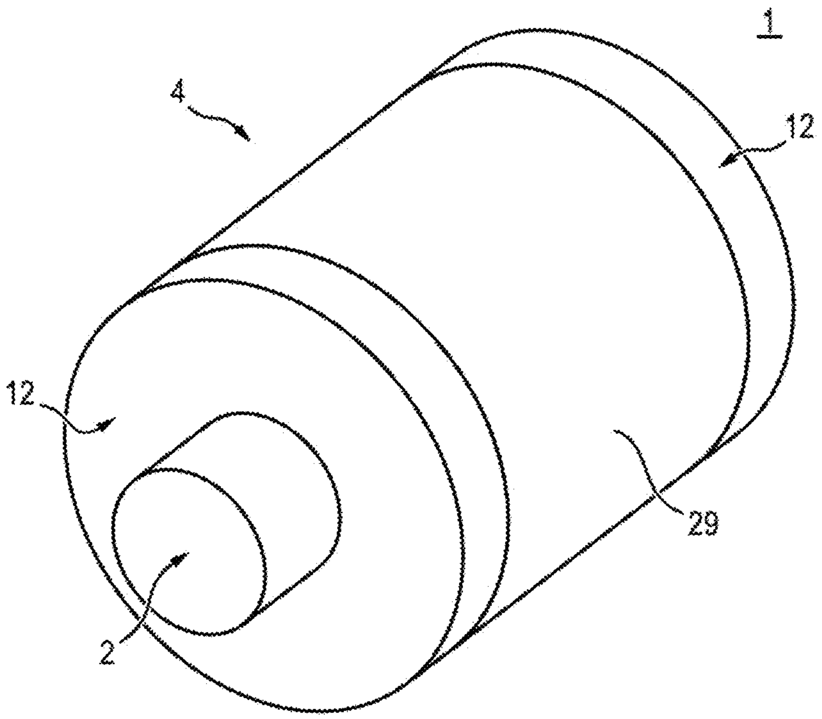
FIG. 2 is a schematic perspective representation of a rotor according to the invention.
Figure 3:
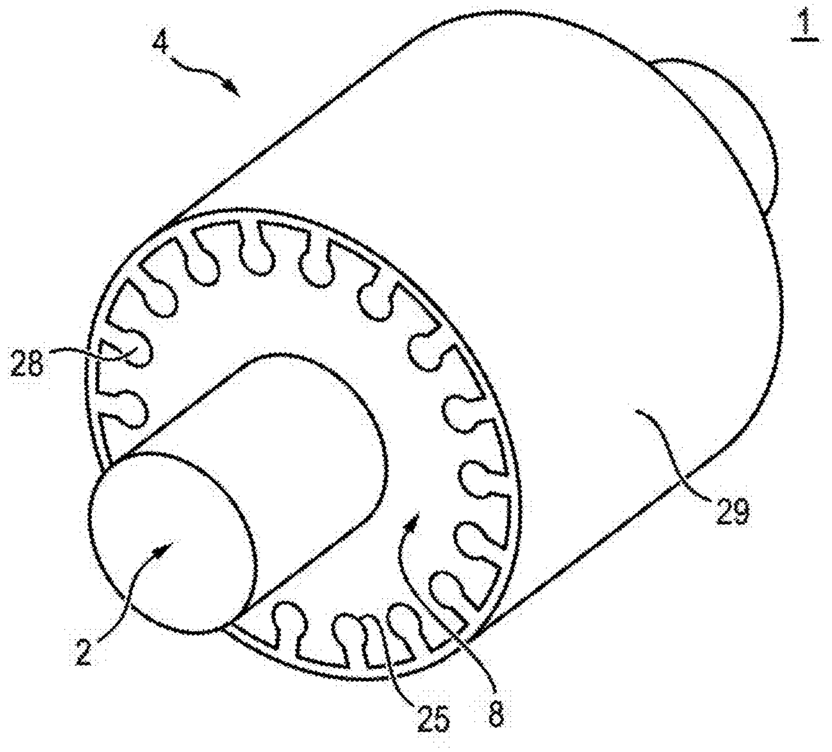
FIG. 3 is a schematic perspective representation in partial section of a rotor according to the invention.

According to a first aspect, the invention proposes a rotor 1 of an aircraft electric motor, comprising a shaft 2 made of a first material and a conductive assembly 4 made of a second material different from the first material.

It is specified that in the present document, by "conductive" it is meant an electrically conductive element, that is to say able to allow a circulation of electricity within it.

Shaft

The shaft 2 is a one-piece revolution part.

In the present document, an orthogonal reference frame linked to the shaft 2 is defined. In this orthogonal reference frame, the longitudinal direction corresponds to the axis of revolution of the shaft 2. The radial direction is a direction perpendicular to the longitudinal direction, extending from the longitudinal direction towards an external cylindrical surface of the shaft 2. The tangential direction is a direction perpendicular to the longitudinal direction and to the radial direction. The tangential direction is tangent to an external cylindrical surface of the shaft 2.

The shaft 2 has in particular a shoulder portion 6. It is specified that by "shoulder portion" it is meant a portion comprised between two circular crowns normal to the axis of revolution of the shaft 2 and resulting from a sudden variation in diameter.

The shoulder portion 6 has two end regions 8 (i.e. each being a circular crown). Each end region 8 of the shoulder portion 6 has a groove intended to accommodate a ring 12.

Figure 4:
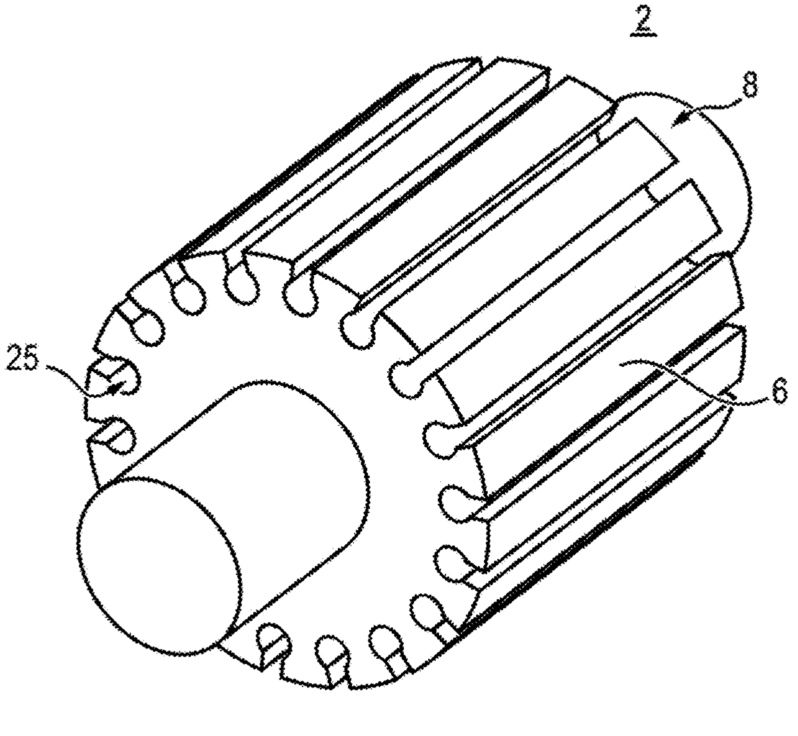
FIG. 4 is a schematic perspective representation of a shaft according to the invention.
Figure 5:
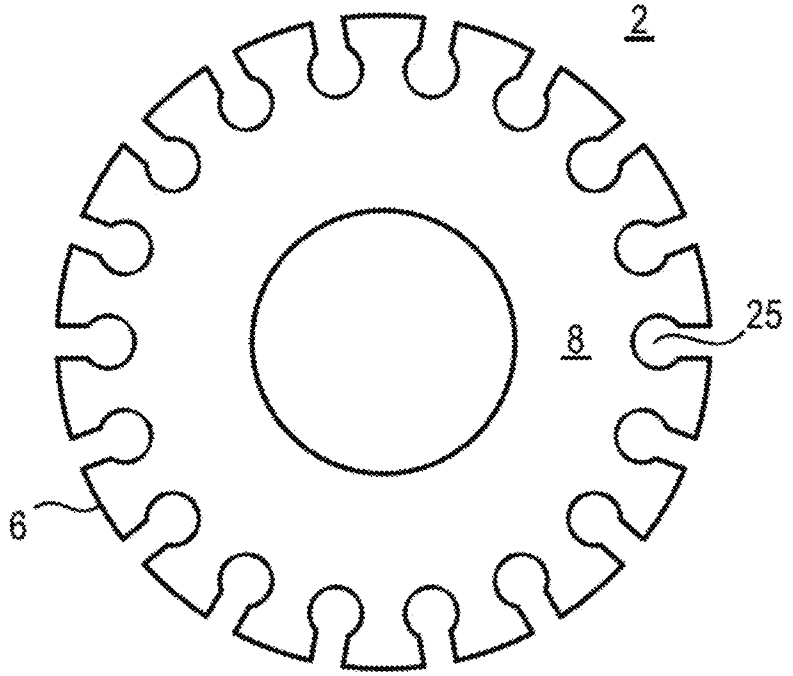
FIG. 5 is a schematic front representation of a shaft according to the invention.

In addition, as represented in particular in FIGS. 4 and 5, the shoulder portion 6 comprises a plurality of longitudinal notches 25. Each notch 25 is in the form of a slot (or a channel) in the shoulder 6. In other words, the notches 25 are intaglio sculptures in the surface of the shoulder 6. Each notch 25 has a through-opening on the surface of the shoulder 6.

Figure 6:
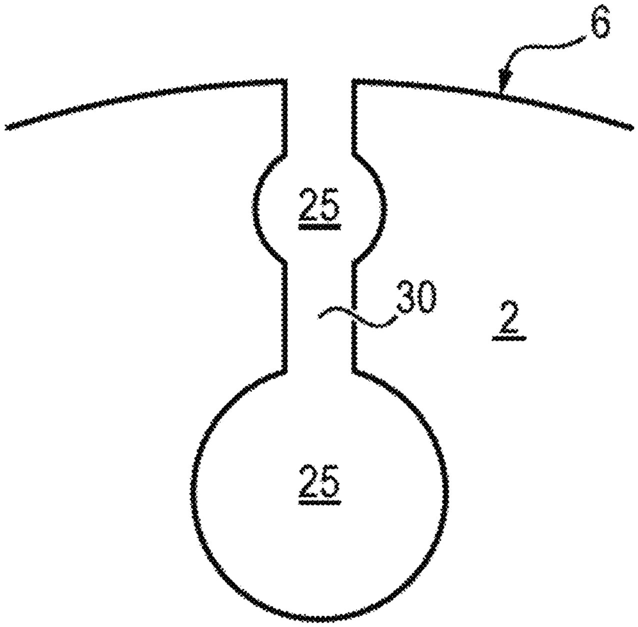
FIG. 6 is a schematic representation of two radially superimposed contiguous notches.
Figure 7:
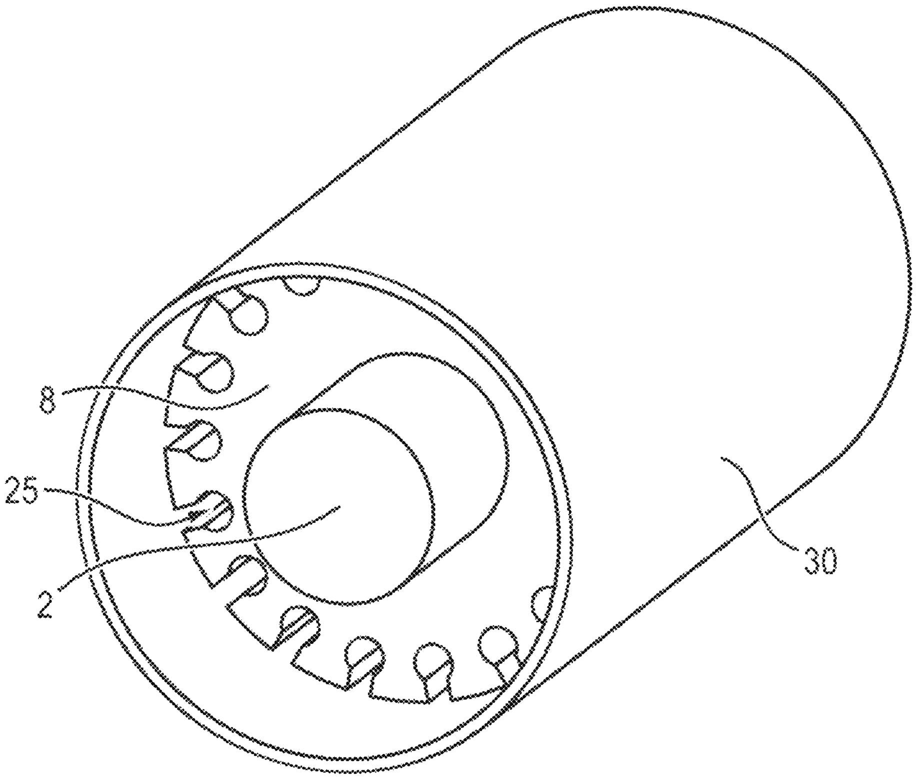
FIG. 7 is a schematic representation of the positioning of a shaft in a casing according to the invention.

According to one particular arrangement, schematized in FIG. 6, several notches 25 can be radially superimposed in the shoulder 6. By "radially superimposed" it is meant that—for example—two notches 25 can succeed one another along the same radial direction. According to this arrangement which can be called "double notch", two radially superimposed contiguous notches 25 have an opening 30 connecting said two contiguous notches. In other words, two radially superimposed and contiguous notches 25 communicate via an opening 30 connecting them.

When the notches 25 are filled by conductive bars of the conductive assembly 4, the architecture called double-notch architecture 25 (i.e. two radially superimposed notches 25) makes it possible to optimize the profile of the torque that can be delivered by an electric motor comprising a rotor 1.

As represented in FIGS. 4 to 8, the notches 25 can be tangentially distributed in the shoulder 6. Even more preferably, the notches 25 are equally distributed.

In addition, according to an arrangement not represented in the figures, the shaft 2 can have a longitudinal bore. The bore can comprise a splined portion.

Typically, the shaft 2 is made of a magnetic material comprising an alloy of iron and carbon.

Preferably, the alloy of the shaft 2 is a steel comprising mainly iron and carbon. In a particularly preferable manner, the alloy is a martensitic steel comprising more than 1% carbon. This steel structure allows the shaft 2 to channel the magnetic field lines coming from the windings to the stator (when the rotor is operating in an electric motor) so that the conductive element 4 receives as much magnetic field as possible.

For example, the alloy of the shaft can be chosen from 17-4PH, AISI 416 (EN-1-4005), AISI 431 (EN-1-4057), AISI 1020 (XC18), AISI 1045 (XC48).

It is specified that this alloy can comprise other components in addition to iron and carbon, for example in order to make the steel stainless (example: Chrome Cr, Nickel Ni . . . ).

The geometry of the shaft 2 can for example be obtained by turning and the martensitic structure is obtained by heat treatment.

Conductive Assembly

The conductive assembly 4 is a one-piece structure-preferably made of copper-positioned on the shoulder region 6.

As represented in the figures, the conductive assembly 4 comprises a plurality of conductive bars 28 and a skin 29.

The skin 29 covers the shoulder 6. Each conductive bar 28 is positioned in a notch 25. It is remarkable that the conductive bars 28 have a geometry complementary to the notches 25. In other words, each conductive bar 28 fills the totality (or almost the totality) of a notch 25.

Preferably, all the notches 25 are filled by a conductive bar 28 and the entire shoulder 6 and conductive bars 28 are entirely covered by the skin 29.

The skin 29 can advantageously have a thickness of the order of 1 to 5 millimeters.

Furthermore, the conductive assembly 4 can comprise two rings 12 which are each intended to be positioned in a groove of an end region 8.

Preferably, each ring 12 is in one piece with the conductive assembly 4. In other words, preferably, each ring 12 is made integrally with the conductive assembly 4. Thus, the rings 12 are comparable to thicker skin portions 29. The rings 12 have a short-circuit function and serve to loop the induced currents to the rotor.

As indicated previously, preferably, the conductive assembly 4 is made of copper. The copper is chosen for its excellent conductivity. According to another embodiment, the conductive assembly 4 could for example be made of silver or aluminum.

It is specified that the material, such as copper or silver, constituting the conductive assembly 4 is not necessarily a pure material and can be a copper-based, an aluminum-based or a silver-based alloy. For example, the copper alloy can comprise alloying elements such as chromium and zirconium or cobalt or even Beryllium.

Diffusion Welding and Interpenetration Layer

According to one particularly advantageous arrangement of the invention, the conductive assembly 4 is welded to the shoulder portion 6 and to the end regions 8 of the shaft 2. More specifically, each conductive bar 28 is welded in a notch 25 and the skin 29 is welded on the shoulder portion 6, the rings 12 are for their part welded to the end regions 8.

This welding is carried out so that the rotor 1 has an interpenetration layer due to the existence of a diffusion of material between the conductive assembly 4 and the shaft 2, at the level of the shoulder portion 6 and of the notches 25.

In other words, at the level of the shoulder portion 6 and of the notches 25, the rotor has a layer of interpenetration of the material of the shaft 2 and of the material of the conductive assembly 4.

By interpenetration it is meant an alloy layer for alloying the material of the shaft 2 (first material) and the material of the conductive assembly 4 (second material).

It is specified that in a particularly advantageous manner, this interpenetration is carried out without the addition of a third material. In other words, the welding of the conductive assembly 4 and of the shaft 2 only comprises the conductive assembly 4 and the shaft 2 and does not involve any additional material.

Advantageously, and as will be described below, the interpenetration layer is the result of a diffusion welding of the conductive assembly 4 and of the shaft 2. This arrangement very advantageously makes it possible to have an excellent mechanical resistance over the entire surface of the shoulder portion 6, of the end regions 8 and of the notches 25, which allows the rotor 1 to withstand rotational speeds greater than 50,000 rpm in the present configuration.

Manufacturing Method

According to a second aspect, the invention relates to a method for manufacturing a rotor 1 as described above.

Figure 8:
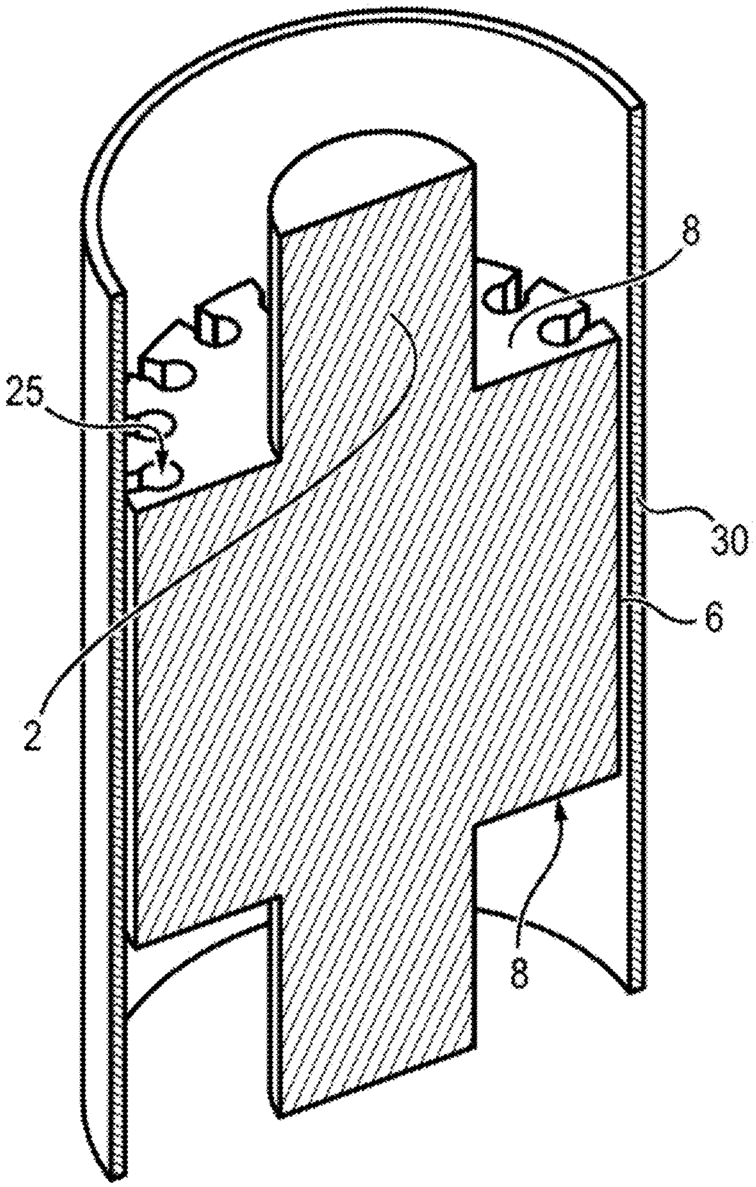
FIG. 8 is a sectional view of the representation of FIG. 7.
Figure 9:
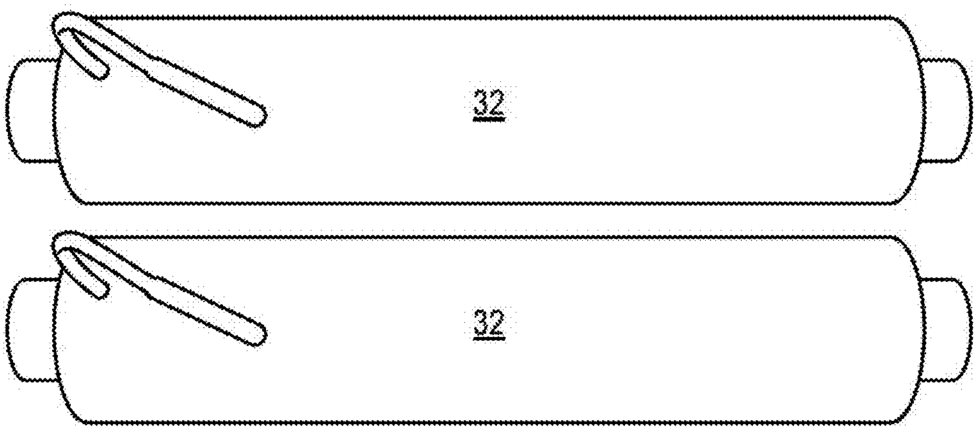
FIG. 9 is a representation of a casing containing a shaft and a powder making it possible to form a conductive assembly.

With reference to FIG. 8, the method comprises the steps of:

- inserting the shaft 2 and an element intended to form the conductive assembly 4 in a tubular protective casing 30;
- heating and pressurizing the assembly 32 containing the casing 30, the element intended to form the conductive assembly 4 and the shaft 2, up to a temperature of formation of the diffusion welding of the conductive assembly 4 and of the shaft 2 to obtain an assembly 32 comprising the casing 30 and the rotor 1;
- heat treatment for cooling the assembly 32;
- tempering the assembly 32; and
- separating the casing 30 and the rotor 1.

It is specified that the diffusion welding is a technique allowing the assembly of elements in solid phase that is to say without fusion, thanks to the simultaneous application of a temperature and of a high pressure.

More preferably, the step of inserting the shaft 2 and an element intended to form the conductive assembly 4 in a tubular protective casing 30 comprises a phase of positioning, around the shaft, a powder intended to form the conductive assembly 4. This metal powder has a particle size equivalent to the one required for a sintering method, for example from around ten to a few tens of μm in average diameter, and an equally controlled distribution.

According to this embodiment, the powder agglomerates and merges, comparable to the sintering method, in the casing 30 to form the conductive assembly 4.

According to one particular arrangement, the method can comprise a preliminary step of machining the shaft 2. More specifically, this preliminary step can comprise at least one phase of machining the notches 25.

Advantageously, the diffusion welding phase can be performed in an enclosure according to a hot isostatic pressing (HIP) method.

It is specified that the diffusion welding is a technique allowing the assembly of elements in solid phase that is to say without fusion thanks to the simultaneous application of a high temperature and pressure.

Typically, a hot isostatic pressing (HIP) method can comprise a step of degreasing and stripping the surfaces of the elements to be assembled, a step of directly contacting the degreased and stripped surfaces of the elements to be assembled, and a step of assembling by diffusion welding the surfaces of the elements in contact.

The step of degreasing and stripping the surfaces of the elements to be assembled can consist of conventional treatments for degreasing and stripping metal surfaces.

The aim of this step is to obtain clean, degreased and oxidation-free surfaces. The degreasing of these surfaces can for example be performed by means of a solvent or of a detergent conventional for degreasing metals. The stripping can be chemical or mechanical stripping, it can for example be carried out by means of an acidic or basic solution, or by rectification or polishing. In a known manner, the stripping technique can be chemical stripping followed by rinsing with water during which the surface of the materials is rubbed using an abrasive pad based, for example, on alumina fibers. This treatment can be repeated several times, the last rinse being carried out with demineralized water.

This list is not exhaustive, the choice of any technique making it possible to eliminate traces of pollution and oxidation on the surfaces of the elements to be assembled is possible.

For the surface of the martensitic stainless steel element to be assembled, the degreasing solvent can be an organic solvent, for example of the ketone, ether, alcohol, alkane type, or chlorinated alkene such as trichloroethylene, or a mixture thereof, etc.

A preferred solvent is a mixture in equal proportions of ethyl alcohol, ether and acetone. Another preferred solvent is trichloroethylene. Chemical stripping can be carried out with an acid solution, for example a 10% hydrofluoric acid bath or a mixture comprising 1 to 5% hydrofluoric acid with 30 to 40% nitric acid. The stripping time can be for example from 10 seconds to 5 minutes, for example from 20 to 30 seconds, at a temperature of 15° C., for example 20° C. The stripped surfaces can then be rinsed in one or several successive baths, for example of demineralized water.

In a known manner, the following step is a step of directly contacting the degreased and stripped surfaces of the elements. This contacting corresponds to placing or positioning the elements to be assembled surface-to-surface, according to a desired stacking. Preferably, this contacting is made within a period of less than one hour following the step of degreasing and stripping the surfaces to be assembled, so as to limit the risks of oxidation, except in the case where special precautions have been taken to store the degreased and stripped elements, these precautions can consist for example in maintaining the elements in a clean and non-oxidizing atmosphere such as nitrogen by means of bagging in sealed bags. This contacting is called "direct" contacting, because it is done according to the present invention without disposing on the surfaces to be assembled an intermediate layer of an alloy as the one described in the prior art. According to the invention, the step that follows the contacting of the surfaces of the elements to be assembled is a step of assembling by diffusion welding the surfaces brought into direct contact. The diffusion welding can be performed for example by isostatic pressing or by uniaxial hot pressing, for example by conventional techniques known to those skilled in the art.

When the diffusion welding is performed by hot isostatic pressing, the materials brought into contact can be introduced into a casing which makes it possible to isolate the elements to be assembled from the atmosphere and to discharge the air from the casing for the assembly of the elements by diffusion welding therein.

It is specified that the casing 30 can be made up of any sealed material sufficiently resistant to withstand at least a partial vacuum therein and to withstand the high temperatures and pressures necessary to assemble the elements. For example, the casing can be a metal casing, for example made of stainless steel, mild steel or titanium and its alloys. It can for example be formed from a sheet metal having a thickness for example of approximately 1 to 20 mm, for example of approximately 1 to 10 mm. Preferably, the casing can match the external shape of the elements to be assembled.

In a known manner, the martensitic stainless steel element (the shaft 2) can close the casing 30 by playing the role of a cover of the casing 30, the shaft 2 can then be welded to the casing 30. In a known manner, this casing 30 can be made by cutting, possibly by bending and welding of a sheet metal or by any method known to those skilled in the art.

The casing 30 is then degassed so as to create a vacuum therein. The degassing can be carried out by means of a vacuum pump and of a heating of the assembly elements to be assembled/casing.

An example of degassing can consist in discharging the air from the casing 30 at ambient temperature until a residual vacuum less than or equal to 10 Pa is obtained, then in heating the assembly to a moderate temperature, for example of less than 300 C for a few hours, for example 5 hours, while continuing the discharge.

It may be useful to check that the casing is sealed, before carrying out the diffusion welding operation, for example by means of a helium test.

Once the degassing step is performed, the casing 30 is made completely sealed by the obturation of the opening used for its discharge, the obturation being carried out for example using TIG welding.

The elements brought into contact in the degassed casing can then be assembled by diffusion welding. The assembly can be carried out in a hot isostatic pressing enclosure.

Heating

More specifically, the heating step comprises a phase of pressurizing the assembly 32. Typically, the pressure inside a heating enclosure (i.e. a furnace) can be brought to a value comprised between 1,000 and 2,000 bars (preferably the pressure can be around 1,500 bars).

In addition, preferably, the heating is carried out in an atmosphere called neutral atmosphere. To do so, the heating enclosure of the furnace used is saturated with a neutral gas (i.e. a rare gas according to the periodic classification of the elements). Preferably, the neutral gas used may be argon. According to another arrangement, the atmosphere of the heating enclosure can be saturated with nitrogen.

One of the objectives of the saturation of the heating enclosure with argon or nitrogen is to remove the oxygen in order to avoid a potential oxidation reaction.

Furthermore, preferably, the heating step is carried out by bringing the assembly 32 to a temperature allowing the diffusion welding but lower than a liquefaction temperature of the copper (and therefore of the steel).

It is specified that by "bringing the assembly to a temperature allowing diffusion welding", it is meant that the temperature of the assembly 32 is increased gradually (linearly) up to a maximum temperature, then the maximum temperature is maintained for a determined period of time.

In a particularly preferred manner, the maximum heating temperature can be comprised between 900° C. and 1,040° C. to dissolve steel.

Preferably, the heating step is carried out gradually over several hours. In a particularly preferred manner, the heating stage lasts around ten hours.

Heat Treatment

Preferably, the heat treatment step can comprise a quenching chosen among open air quenching, water quenching or oil quenching.

It is specified that the quenching can be homogeneous for the entire assembly 32 or can be monitored via in-situ measurements.

Preferably, the quenching heat treatment step is determined so that the steel of the shaft 2 becomes martensitic. More specifically, the heat treatment step makes it possible to remove any possible presence of residual austenite in the steel of the shaft 2.

Preferably, the quenching must correspond to a cooling speed greater than the critical speed to create the martensitic phase, i.e. several tens of degrees/second (°/s).

Figure 12:
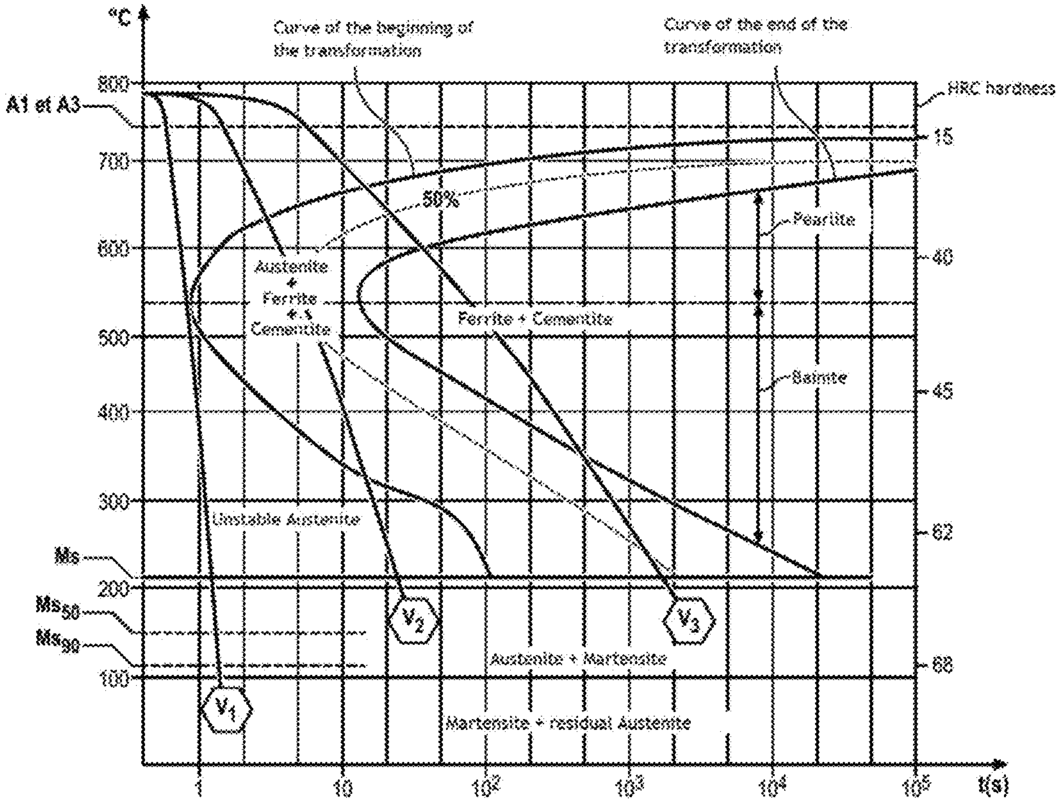
FIG. 12 is a representation of a diagram of the microstructure change of a steel, in a time interval, as a function of the temperature.

With reference to the diagram presented in FIG. 12, the objective of the quenching is to reach at least the area indicated V2 in FIG. 12 and at best the area indicated V1.

Figure 13:
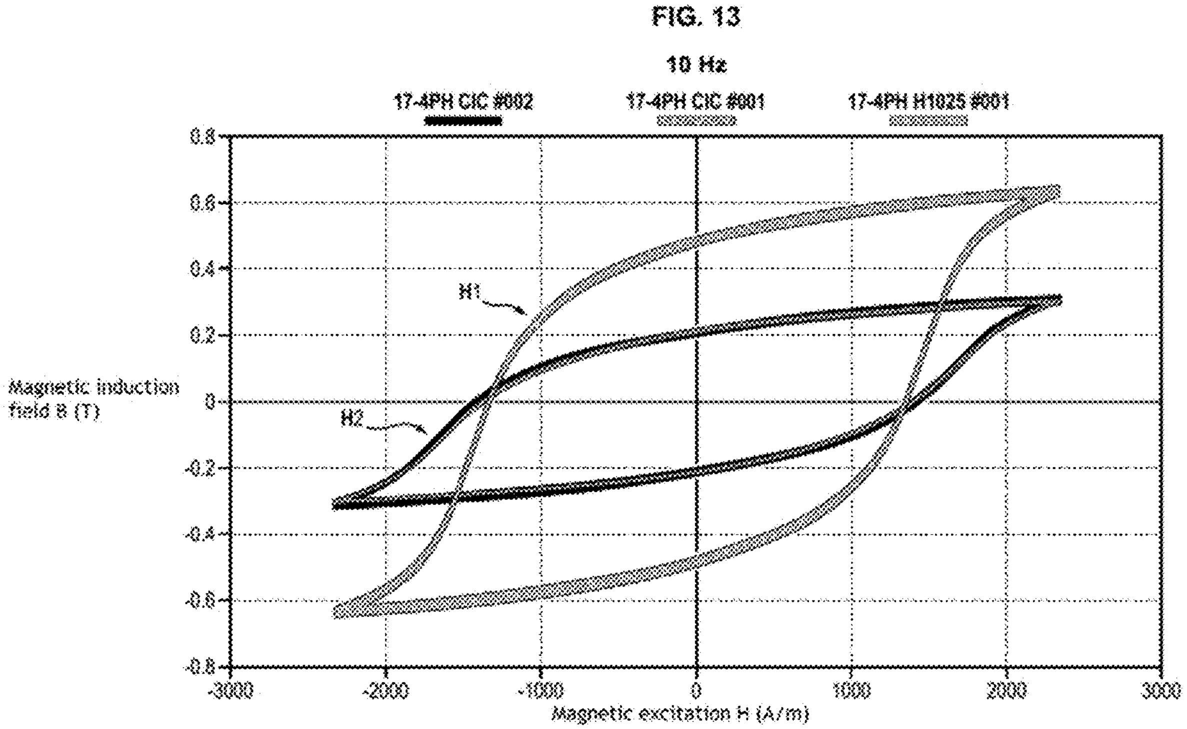
FIG. 13 is a comparative representation of the magnetic hysteresis of two samples of a material having received two different quenches.

The quenching step is very advantageous in improving the electromagnetic properties as shown in FIG. 13 which shows that the cooling speed has a direct impact on the electromagnetic properties of the material. Indeed, the magnetic hysteresis H1 corresponds to a water-quenched material, the magnetic hysteresis H2 corresponds to quenching under water. Thus, it can be observed in FIG. 13 that a specimen cooled under water has better electromagnetic properties than a specimen cooled under water.

After the quenching, it is possible to continue this heat treatment phase by immersing the assembly 32 in a cryogenic bath in order to reduce the presence of residual austenite. Typically the cryogenic bath can be at a temperature below −20° C. In a preferred manner, the assembly 32 is immersed in the cryogenic bath for a period that can be comprised between 10 minutes and 60 minutes.

Tempering

Following the quenching heat treatment, the tempering step makes it possible to cover the desired characteristics for the copper constituting the conductive assembly 4 (mechanical resistance, electrical conductivity, etc.), and makes it possible to soften the martensitic steel to increase its ductility while preserving its electromagnetic properties, which makes it possible to optimize the overall performance of the rotor 1.

The tempering step is a known step in the field of metallurgy. Usually, the tempering can also be called "aging".

Preferably, the tempering is carried out by bringing the assembly 32 to a bearing temperature comprised between 450° C. and 650° C., over a duration comprised between 1 hour and 4 hours. This optimized treatment ensures that the copper alloy has a conductivity equal to or greater than 90% of the conductivity of the pure Copper (% IACS) and ensures that the desired mechanical properties are maintained.

Separation and Finishing

The separation of the casing 30 and of the rotor 1 is carried out by machining the casing 30 to retain only the rotor 1. In other words, the casing 30 is extracted by machining, typically by turning.

Figure 10:
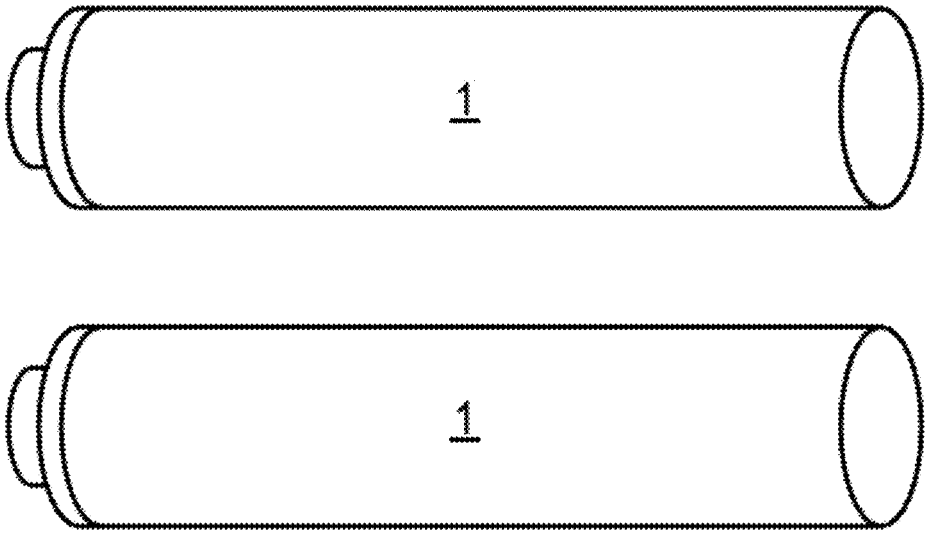
FIG. 10 is a representation of a shaft and of a conductive assembly extracted from the casing.
Figure 11:
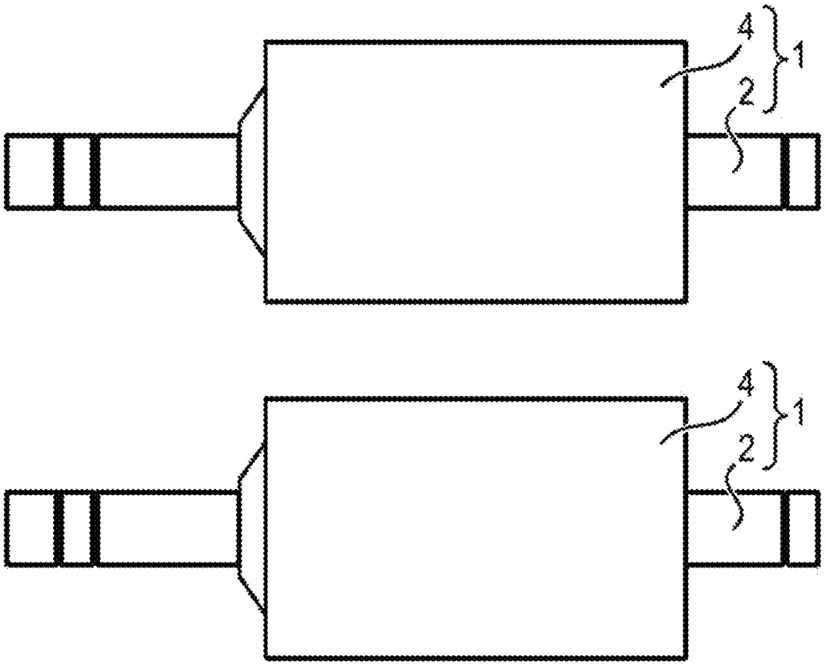
FIG. 11 is a representation of a rotor obtained by a method according to the invention.

The rotor 1 obtained then has blank dimensions, as represented in FIG. 10.

Then, the rotor 1 and more particularly its conductive assembly 4 are machined to have the final dimensions and geometries.

At the end of this last finishing machining step, the rotor 1 obtained has the geometric characteristics necessary for its use, and also has structural and electromagnetic characteristics guaranteeing its resistance during use at rotational speeds greater than 50,000 rpm.

The interdiffusion interlinked area on the part obtained according to the method typically has a thickness of a few tens of μm.

The rotor 1 having a monolithic type structure can be easily balanced statically and dynamically (by localized material removal), which makes it possible to guarantee the lowest vibration level possible and compatible with a high rotational speed of the rotor 1.

The invention claimed is:

1. A rotor of an aircraft electric motor, the rotor comprising:
- a shaft made of a first material; and
- a conductive assembly made of a second material different from the first material, wherein the shaft comprises a shoulder portion, the shoulder portion comprising a plurality of longitudinal notches,
- wherein the plurality of notches comprise:
  - two contiguous notches radially superimposed in the shoulder portion;
  - a first opening on a radially outer face of the shoulder portion; and
  - a second opening connecting the two contiguous notches, and
- wherein the conductive assembly is a one-piece structure, the one-piece structure comprising:
- at least one conductive bar configured to be positioned in one notch of the plurality of notches; and
- a skin configured to be fixed on the shoulder portion.

2. The rotor according to claim 1, further comprising an interpenetration layer of the first material and of the second material, the interpenetration layer being between the shaft and the conductive assembly, and the interpenetration layer comprising an alloy of the first material and an alloy of the second material.

3. The rotor according to claim 1, wherein the conductive assembly further comprises:
- a first ring being fixed to the rotor at a first end region of the shoulder portion; and
- a second ring being fixed to the rotor at a second end region of the shoulder portion.

4. The rotor according to claim 1, further comprising a plurality of notches tangentially distributed in the shoulder portion.

5. The rotor according to claim 1, wherein,
- the at least one conductive bar and the skin are integrally formed as a one-piece structure.

6. The rotor according to claim 1, the shaft further comprising:
- a rod portion extending along a longitudinal direction corresponding to the axis of revolution of the shaft, wherein
  - the rod portion and the shoulder portion are integrally formed as a one-piece revolution part.

7. A method for manufacturing a rotor, the method comprising at least one of:
- inserting a shaft and an element intended to form a conductive assembly in a tubular protective casing;
- heating and pressurizing the conductive assembly containing the protective casing, the element intended to form the conductive assembly and the shaft, up to a temperature of formation of the conductive assembly and of diffusion welding of the conductive assembly and of the shaft to obtain an assembly comprising the protective casing and the rotor;
- heat treating the assembly by cooling the assembly;
- tempering the assembly; and
- separating the protective casing and the rotor.

8. The method according to claim 7 wherein inserting the element intended to form the conductive assembly in the tubular protective casing comprises inserting by positioning around the shaft a powder intended to form the conductive assembly in the tubular protective casing.

9. The method according to claim 7, wherein heating and pressurizing the assembly is carried out in a dedicated enclosure and in a neutral atmosphere.

10. The method according to claim 7, wherein heat treating comprises quenching, and the quenching comprises at least one of:
- a natural convection gas quenching;
- a forced convection gas quenching;
- a water quenching; or
- an oil quenching.

11. The method according to claim 7, wherein heat treating is carried out until at least one component of iron and carbon of a material of the shaft becomes martensitic.

12. The method according to claim 7, further comprising a preliminary step of machining the shaft.

13. The method according to claim 12, wherein machining the shaft comprises machining at least one notch in the shaft.

14. A method for manufacturing a rotor, the method comprising:
- inserting a shaft and an element intended to form a conductive assembly in a tubular protective casing;
- heating and pressurizing the conductive assembly containing the protective casing, the element intended to form the conductive assembly and the shaft, up to a temperature of formation of the conductive assembly and of diffusion welding of the conductive assembly and of the shaft to obtain an assembly comprising the protective casing and the rotor;
- heat treating the assembly by cooling the assembly;
- tempering the assembly; and
- separating the protective casing and the rotor.

* * * * *